Dec. 1, 1964   W. A. REANEY ETAL   3,159,386
PREHEATER FOR ROTARY KILN

Filed Dec. 26, 1961   3 Sheets-Sheet 1

INVENTORS
WARFORD A. REANEY
DAVID W. REANEY
BY
*Schmieding and Fultz*
ATTORNEYS

INVENTOR.
WARFORD A. REANEY
DAVID W. REANEY
BY
Schmieding and Fultz
ATTORNEYS

*INVENTOR.*
WARFORD A. REANEY
DAVID W. REANEY
BY *Schmieding and Fultz*
ATTORNEY United States Patent Office 3,159,386
Patented Dec. 1, 1964

3,159,386
PREHEATER FOR ROTARY KILN
Warford A. Reaney, 264 W. Lincoln Ave., Delaware, Ohio, and David W. Reaney, 89 Shore Drive, North Madison, Ohio
Filed Dec. 26, 1961, Ser. No. 163,383
2 Claims. (Cl. 263—32)

This invention relates to method and apparatus for burning raw materials and particularly to novel pre-heater construction for use with such apparatus.

This application is a continuation-in-part of our copending application Serial No. 49,266 filed August 12, 1960, now abandoned.

In general, the pre-heater of the present invention includes an outer column for containing raw materials and delivering same to the intake end of a kiln which may be of the rotary type used in the burning of raw materials. An inner column is disposed within the outer column and connected with the end of the kiln for receiving a flow of hot gases therefrom. The column includes an upper end or chimney provided with a plurality of radially extending gas discharge conduits which extend outwardly into the supply of raw materials contained between the inner and outer columns.

It has been discovered that when raw materials, such as limestone, are stored between inner and outer columns of the pre-heater apparatus of the type just described, the material is more densely packed in the vicinity of the inner column and less densely packed and more permeable by hot gases adjacent the wall of the outer column.

In accordance with one aspect of the present invention the above mentioned chimney portion of the inner column is inclined upwardly and rearwardly with respect to the longitudinal axis of said outer column. This provides a highly advantageous function of concentrating the heating effect in the forward and side portions of the storage compartment nearest to the raw material outlet leading to the kiln. This arrangement may be thought of as dividing the storage compartment between said inner and outer columns into what may be termed a live forward storage portion and a dead rear storage portion. Hence it will be understood that the preheating effect is concentrated on the material that should be preheated that is the portion of the material moving into the kiln.

In accordance with another aspect of the present invention the chimney portion of the inner column is provided with a plurality of radially outwardly extending gas discharge conduits which are arranged to direct the major portion of the hot gaseous flow into the more densely packed raw materials adjacent the outer wall of the inner column, said conduits being also arranged to evenly distribute the heating effect of the hot gases throughout the raw material surrounding the inner column. It has been discovered that such arrangement of gas discharge conduits, in combination with suction means for drawing hot gases from the kiln through the raw materials counteracts the natural tendency for the hot gases to seek the path of least resistance through the less densely packed materials whereby overheating of this portion of the raw materials is prevented.

Hence it will be understood that the heating effect of the hot gases is equally distributed throughout the supply of raw materials to be heated.

In accordance with another aspect of the present invention the inner column of the preheater is provided with an inner column that includes a corrosion resistant metal chimney portion that efficiently transfers heat from the hot flowing gases to the portion of the raw materials adjacent the wall of the inner column.

As still another aspect of the present invention, the draft through the kiln is controlled in a novel manner by raising or lowering the level of the raw materials in the preheater whereby more or less chimney outlet ports are uncovered to increase or decrease the resistance to flow products imposed by the preheater on the hot gaseous products of combustion.

It is, therefore, an object of the present invention to provide a novel preheater apparatus for a kiln that includes a chimney and outer column construction that concentrates the preheating effect on the portion of the material in the storage compartment that is closest to the entrance to the kiln.

It is another object of the present invention to provide a novel preheater apparatus for a kiln which includes novel gas discharge means for releasing hot gases, with a controlled distribution pattern to a supply of raw materials for the purpose of evenly preheating same prior to delivery to the kiln.

It is another object of the present invention to provide an apparatus of the type described which includes an inner gas discharge column provided with a corrosion resistant metal chimney portion that efficiently transfers heat evenly throughout a surrounding supply of raw materials, said transfer being effected both by direct contact heat transfer and by the division and equal distribution of radially directed gaseous flows.

Further objects and advantages of the present invention will be apparent from the following description, reference being had to the accompanying drawings wherein preferred forms of embodiments of the invention are clearly show.

Figure 1:
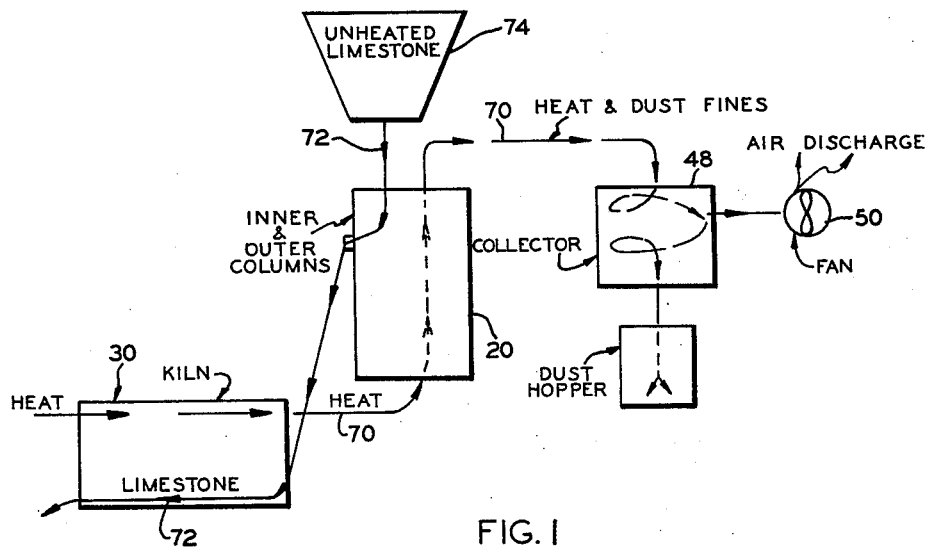
FIG. 1 is a schematic flow diagram of the preheater apparatus of the preceding figures.

Referring in detail to the drawings, FIG. 1 diagrammatically illustrates a flow 70 of the heated gases from a kiln 30 to and through an exhaust fan 50 as well as a flow 72 of raw materials from an unheated raw materials hopper 74 to the raw materials inlet end of a kiln 30.

Figure 2:
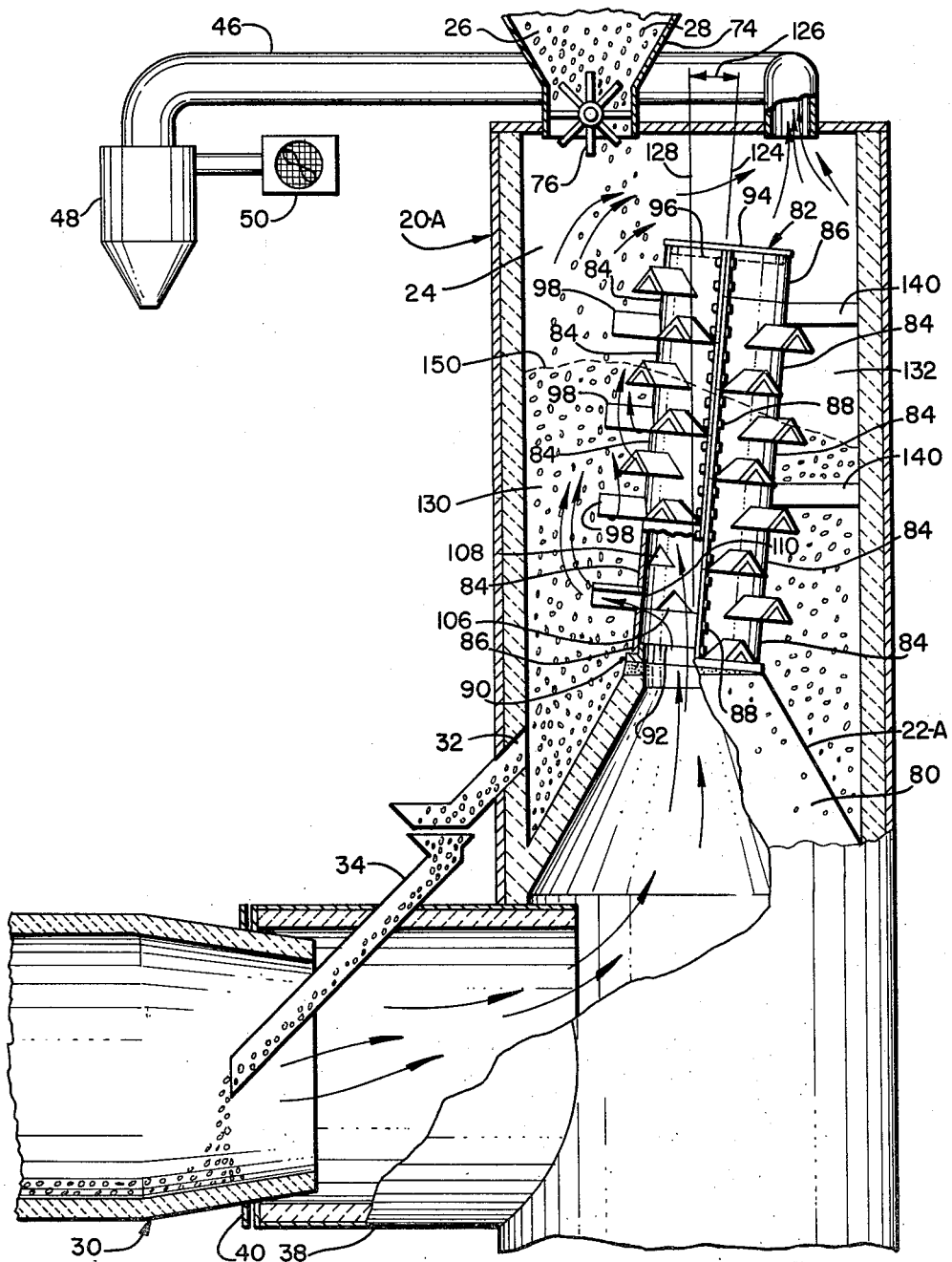
FIG. 2 is a side elevational view of a modified preheater apparatus constructed in accordance with the present invention, the section being taken along a vertical plane through the center line of the apparatus.

Referring next to FIG. 2, raw materials are dumped into hopper 74, FIG. 1, which passes through a rotary gate 76 and into chamber 24. The hot gases produced by firing kiln 30 flow through gas intake 38, vertically extending column 22–A, radially extending passage 108, gas discharge conduit 46, dust collector 48, and through exhaust fan 50 to the environment.

It has been found in a vertically disposed storage container which has inner and outer vertical columns, that raw material, such as limestone, accumulates in a relatively densely packed state adjacent the inner column and in a relatively loose pervious state adjacent the wall of the outer column. Accordingly it is advantageous to distribute the major portion of the available preheating effect on the densely packed portion of the raw materials and a minor portion of the preheating effect on the relatively looesly packed material. This provides an evenly distributed pattern of the preheating effect and prevents excessive preheating of the outer wall surrounding the relatively loosely packed portion of the raw materials.

Reference is next made to FIG. 2 which illustrates a modified preheater apparatus constructed in accordance with the present invention. The preheater includes a gas intake conduit 38 and an article discharge chute 34 in communication with a rotary kiln indicated generally at 30.

The preheater of FIG. 2 includes an outer column indicated generally at 20–A that is preferably formed of an outer steel shell and an inner column 22–A, the latter including a lower cone shaped section 80 built up of refractory brick and an upper portion or chimney indicated generally at 82 formed of non-corrosive metallic sections 84 and 86. These sections are joined together at confronting flange sections by a plurality of threaded fasteners 88.

The lower end of chimney 82 is provided with an annular cast metal base 90 that includes an upstanding inner flange 92 surrounded by the lower end of chimney 82.

The upper end of chimney 82 is closed by a non-corrosive metal cap 94 provided with a downturned annular flange 96 that fits into the upper end of chimney 82.

With continued reference to FIG. 2 chimney 82 further includes a plurality of gas discharge conduits 98 which extend laterally outwardly into the raw material contained in chamber 24 for only a relatively short radial distance whereby the heating effect of the hot gases is concentrated on the more densely packed raw material surrounding chimney 82.

Figure 3:
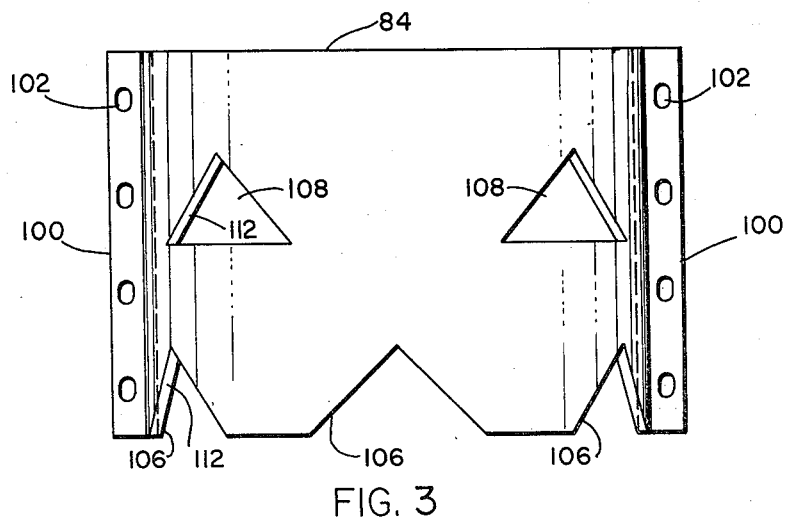
FIG. 3 is a side elevational view of a segment from which the chimney of the apparatus of FIG. 2 is constructed.
Figure 4:
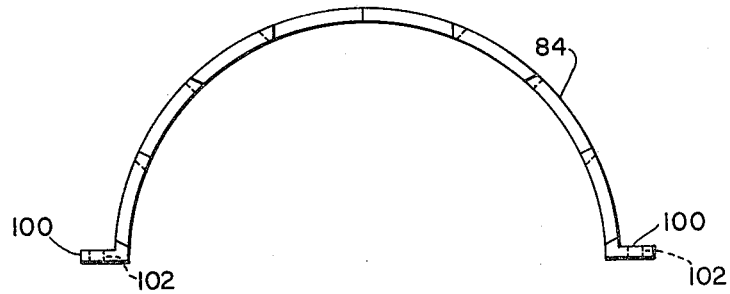
FIG. 4 is a top elevational view of the segment of FIG. 3.

Reference is next made to FIGS. 3 and 4 which illustrate one of the non-corrosive metal sections 84 of semi-circular shape which includes flanges 100 provided with vertically spaced holes 102 for receiving the previously mentioned threaded fastenings 88.

As is best seen in FIG. 3 section 84 includes a plurality of circumferentially spaced V-shaped notches 106 and triangular openings 108. The previously mentioned gas discharge conduits, of V-shaped cross section, have their inner edges 110 welded to the edges 112 of notches 106 and openings 108.

Figure 5:
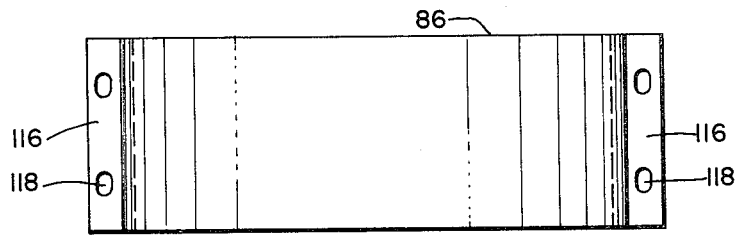
FIG. 5 is a side elevational view of a second segment construction comprising a portion of the preheater chimney of FIG. 2.

FIG. 5 illustrates the other non-corrosive metallic section 86 which are utilized only at the bottom and top of chimney 82 as is illustrated in FIG. 2 to provide the staggered relationship illustrated using the standard size section 84 throughout the vertical extent of chimney 82. Section 86 is provided with flanges 116 and holes 118 for joining the sections together.

Referring again to FIG. 2, top wall of outer column 20–A is provided with an outlet conduit 46 which leads to an appropriate suction means as the exhaust fan 50.

The top wall of the outer column also includes a raw material intake opening 26 for the introduction of raw materials 28, said intake opening preferably being provided with a rotary gate 76.

Chimney 82 is preferably inclined such that the longitudinal axis 124 forms an angle 126 with the vertical central axis 128 of the kiln and the rearmost of the holes 108, facing the rear of the chimney portion, away from the kiln, are plugged by any suitable obstructing means such that the heating effect is concentrated in the forward and side portions of the storage compartment nearest to the raw material outlet 32 and kiln 30. This divides storage compartment 24 into what may be termed a live forward storage portion 130 and a dead rear storage portion 132.

A plurality of radially extending braces 140 may be included to support the upper portion of chimney 82 in the inclined configuration shown in FIG. 2.

In the operation, the gas discharge conduits 98 extend only a relatively short distance outwardly relative to the radial width of the preheater whereby the gases pass outwardly through the open ends of the conduits 98 in the proximity of the inner column 82 whereby the heating effect of the hot gaseous flow is concentrated on the more densely packed body of raw materials adjacent the inner column.

It should further be pointed out that the chimney portion of the inner column is inclined upwardly and rearwardly at an angle 126 relative to vertical axis 128, and since the rear outlet openings 106 and 108 at the rear of the chimney portion away from the kiln are plugged, the heating effect of the hot gases is concentrated in what may be termed a live zone 130, towards the front of the preheater, with only a minor portion of the heating effect being dissipated to what may be termed a dead zone 132 at the rear of the preheater.

The operation of the modification of FIGS. 6 through 9 is also different from the previous modification in that the metal walls of the chimney portion 82 transfer heat uniformly to the immediately surrounding most densely compacted portion of the raw materials.

Where it is desired to vary the draft through rotary kiln 30 the surface level 150 of the raw materials is raised or lowered by admitting more or less material through gate 76. This increases or decreases the number of outlet conduits 98 which are covered by a surrounding resistance imposing bed of raw materials.

While the forms of embodiments of the present invention as herein disclosed constitute preferred forms, it is to be understood that other forms might be adopted, all coming within the scope of the claims which follow:

We claim:

1. A kiln preheater apparatus comprising in combination a kiln including an open end for receiving raw materials and for releasing hot gaseous products of combustion; a preheater including an outer vertically extending column forming a chamber for receiving and containing raw materials; a raw material inlet opening in the upper portion of said outer column; means forming a gas outlet opening for the upper portion of said outer column; an inner column including an open lower end, a closed upper end, and an upper chimney portion formed of corrosion resistant metal, said chimney portion including a plurality of spaced gas outlet openings; means connecting said chimney portion to said outer vertical column to support said chimney portion of said inner column in an upwardly and rearwardly inclined direction with respect to a vertically extending axis through the center line of said preheater; a plurality of inverted trough shaped members mounted on said chimney portion at said openings and extending radially outwardly therefrom; a gas inlet conduit extending through a wall of said outer column and connecting said open end of said kiln with said open lower end of said inner column; and suction means for drawing hot gases from said open end of said kiln, through said inner column, outwardly through said inverted trough shaped members and in rapid flow heat exchange relationship with said raw materials.

2. The kiln preheater apparatus defined in claim 1 wherein said chimney portion of said inner column is formed from a plurality of metal sections arranged in superimposed staggered relationship.

References Cited in the file of this patent

UNITED STATES PATENTS

| 267,813 | Wiesebrock | Nov. 21, 1882 |
| 685,336 | Le Roy et al | Oct. 29, 1901 |
| 698,129 | Niese | Apr. 22, 1902 |
| 746,822 | Gorham | Dec. 15, 1903 |

FOREIGN PATENTS

| 1,103,658 | France | Nov. 4, 1955 |
| 1,191,676 | France | Oct. 21, 1959 |